(12) United States Patent
Shimada et al.

(10) Patent No.: US 9,194,322 B2
(45) Date of Patent: Nov. 24, 2015

(54) CONTROL DEVICE OF AN ENGINE

(75) Inventors: Masanori Shimada, Susono (JP);
Shinsuke Aoyagi, Zama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/390,394

(22) PCT Filed: May 11, 2011

(86) PCT No.: PCT/JP2011/060858
§ 371 (c)(1),
(2), (4) Date: Feb. 14, 2012

(87) PCT Pub. No.: WO2012/153403
PCT Pub. Date: Nov. 15, 2012

(65) Prior Publication Data
US 2014/0058646 A1    Feb. 27, 2014

(51) Int. Cl.
*F02D 41/30*    (2006.01)
*F02D 41/14*    (2006.01)
(Continued)

(52) U.S. Cl.
CPC ............ *F02D 41/30* (2013.01); *F02D 41/1454* (2013.01); *F02D 41/1458* (2013.01);
(Continued)

(58) Field of Classification Search
CPC . F02D 41/30; F02D 41/1454; F02D 41/1458; F02D 41/1461; F02D 41/1462; F02D 41/182; F02D 41/221; F02D 41/222; F02D 41/2467; F02D 41/2474; F02D 2041/224
USPC .......... 701/104; 123/672, 673, 683, 674, 690, 123/699, 434, 435, 436, 675, 676, 677, 679, 123/678, 680, 681, 684, 685, 688, 689, 691, 123/692, 693, 694, 695, 696, 697, 698, 700
See application file for complete search history.

(56) References Cited

U.S. PATENT DOCUMENTS 4,817,383 A * 4/1989 Masui .............................. 60/274
5,115,639 A * 5/1992 Gopp .............................. 60/274
(Continued)

FOREIGN PATENT DOCUMENTS

JP    2006299886    * 10/1994
JP    A-06-299886    10/1994
(Continued)

OTHER PUBLICATIONS

Shimizu Makoto; Machine translation of JP2000110647.*
(Continued)

*Primary Examiner* — Lindsay Low
*Assistant Examiner* — John Bailey
(74) *Attorney, Agent, or Firm* — Oliff PLC (57) ABSTRACT

The invention relates to a control device of an engine, including fuel supplying means, target fuel supply amount setting means, fuel supply command value providing means, supplied air amount detection means, air-fuel ratio detection means, air-fuel ratio calculation means, exhaust gas component concentration detection means and exhaust gas component concentration calculation means. In the invention, the fuel supply command value or the fuel supply amount grasped therefrom is amended and the amount of the air detected by the supplied air amount detection means is amended such that the difference between the air-fuel ratio detected by the air-fuel ratio detection means and the air-fuel ratio calculated by the air-fuel ratio calculation means and the difference between the concentration of the specified component detected by the exhaust gas component concentration detection means and the concentration of the specified component calculated by the exhaust gas component concentration calculation means become small.

11 Claims, 4 Drawing Sheets

(51) Int. Cl.
   *F02D 41/22* (2006.01)
   *F02D 41/24* (2006.01)
   *F02D 41/18* (2006.01)

(52) U.S. Cl.
   CPC ........ *F02D41/1461* (2013.01); *F02D 41/1462* (2013.01); *F02D 41/221* (2013.01); *F02D 41/2467* (2013.01); *F02D 41/2474* (2013.01); *F02D 41/1452* (2013.01); *F02D 41/1453* (2013.01); *F02D 41/1459* (2013.01); *F02D 41/182* (2013.01); *F02D 41/222* (2013.01); *F02D 2041/224* (2013.01); *Y02T 10/40* (2013.01)

(56) References Cited

U.S. PATENT DOCUMENTS

| | | | |
|---|---|---|---|
| 5,126,943 A * | 6/1992 | Nakaniwa | 701/106 |
| 5,227,975 A * | 7/1993 | Nakaniwa | 701/103 |
| 5,426,934 A * | 6/1995 | Hunt et al. | 60/276 |
| 5,738,070 A * | 4/1998 | Donaldson et al. | 123/352 |
| 6,493,626 B2 * | 12/2002 | Mitani et al. | 701/103 |
| 6,705,081 B2 * | 3/2004 | Kamen et al. | 60/521 |
| 7,680,586 B2 * | 3/2010 | Ruth et al. | 701/109 |
| 8,175,789 B2 * | 5/2012 | Kojima et al. | 701/104 |
| 8,360,040 B2 * | 1/2013 | Stewart et al. | 123/672 |
| 8,627,858 B2 * | 1/2014 | Elwart | 141/83 |
| 2002/0124832 A1 * | 9/2002 | Oota et al. | 123/480 |
| 2004/0098190 A1 * | 5/2004 | Nakayama et al. | 701/104 |
| 2004/0193358 A1 * | 9/2004 | Yasui | 701/109 |
| 2008/0148811 A1 * | 6/2008 | Ruth et al. | 73/23.21 |
| 2008/0154476 A1 * | 6/2008 | Takubo | 701/101 |
| 2008/0202118 A1 * | 8/2008 | Ide et al. | 60/605.2 |
| 2008/0243358 A1 * | 10/2008 | Kojima et al. | 701/102 |
| 2008/0249697 A1 * | 10/2008 | Stewart et al. | 701/106 |
| 2008/0300767 A1 * | 12/2008 | Winstead | 701/101 |
| 2009/0063019 A1 * | 3/2009 | Yamada et al. | 701/104 |
| 2009/0076713 A1 * | 3/2009 | Bailey et al. | 701/103 |
| 2009/0112447 A1 * | 4/2009 | Ishizuka et al. | 701/109 |
| 2009/0125214 A1 * | 5/2009 | Yoshikawa | 701/104 |
| 2009/0306879 A1 * | 12/2009 | Takubo | 701/104 |

FOREIGN PATENT DOCUMENTS

| | | | |
|---|---|---|---|
| JP | 2000110647 | * | 4/2000 |
| JP | A-2000-110647 | | 4/2000 |
| JP | 2007262946 | * | 10/2007 |
| JP | A-2007-262946 | | 10/2007 |
| JP | 2008095615 | * | 4/2008 |
| JP | A-2008-095615 | | 4/2008 |
| JP | 2010180802 | * | 2/2009 |
| JP | 2009103062 | * | 5/2009 |
| JP | A-2009-103062 | | 5/2009 |
| JP | A-2010-180802 | | 8/2010 |
| JP | 2011027059 | * | 2/2011 |
| JP | A-2011-027059 | | 2/2011 |
| WO | WO 2010/090035 A1 | | 8/2010 |
| WO | WO2010090035 | * | 8/2010 |
| WO | WO 2010/109667 A1 | | 9/2010 |
| WO | WO2010109667 | * | 9/2010 |

OTHER PUBLICATIONS

Suzuki Jun; Machine translation of JP2008095615.*
Hamburg Douglas; Machine translation of JP2006299886.*
Iwatani Kazuki; Machine translation of JP2007262946.*
US20110289918 is english equivalent to JP2010180802.*
US20110289918 is english equivalent to WO2010090035.*
US2011029218 is english equivalent to JP2011027059.*
US2012014838 is english equivalent to WO2010109667.*
US2009112447is english equivalent to JP2009103062.*
International Search Report issued in International Application No. PCT/JP2011/060858 dated Jul. 12, 2011 (with translation).

* cited by examiner

CONTROL DEVICE OF AN ENGINE

TECHNICAL FIELD

The invention relates to a control device of an engine.

BACKGROUND ART

An engine comprising injectors, an air flow meter, an air-fuel ratio sensor and an electronic control unit is described in the Patent Document 1. The injectors are positioned on a body of the engine and inject fuel to combustion chambers when the injectors receive commands to inject fuel from the electronic control unit. The air flow meter is positioned on an air intake passage of the engine and output an output value corresponding to an amount of the air passing the air flow meter. The electronic control unit calculates the amount of the air passing the air flow meter on the basis of this output value. It should be noted that the air passing the air flow meter flows into the combustion chambers. Therefore, it may be said that the air flow meter detects the amount of the air flowing into the combustion chambers (hereinafter, this amount will be referred to as—intake air amount—). The air-fuel ratio sensor is positioned on an exhaust passage of the engine and outputs an output value corresponding to a concentration of oxygen in an exhaust gas reaching the air-fuel ratio sensor. The electronic control unit calculates an air-fuel ratio of the mixture gas formed in the combustion chambers on the basis of this output value. Therefore, it may be said that the air-fuel ratio sensor detects the air-fuel ratio of the mixture gas formed in the combustion chambers (hereinafter, this air-fuel ratio will be simply referred to as—air-fuel ratio of the mixture gas—)

A difference may occur between an actual fuel injection amount (i.e. an amount of the fuel actually injected from the injectors) and the commanded fuel injection amount (i.e. the amount of the fuel to be injected commanded to the injectors by the electronic control unit). Further, a difference may be occur between an actual intake air amount (i.e. an amount of the air actually sucked into the combustion chambers) and a detected intake air amount (i.e. an amount of the air detected by the air flow meter). When the difference occurs between the actual fuel injection amount and the commanded fuel injection amount and the electronic control unit performs a control assuming that no difference occurs between the actual fuel injection amount and the commanded fuel injection amount, no desired performance of the engine may be obtained. Further, when the difference occurs between the actual intake air amount and the detected intake air amount and the electronic control unit performs a control assuming that no difference occurs between the actual intake air amount and the detected intake air amount, no desired performance of the engine may be obtained.

In the engine described in the Patent Document 1, an air-fuel ratio of the mixture gas is calculated using the commanded fuel injection amount and the detected intake air amount (hereinafter, this calculated air-fuel ratio will be referred to as—estimated air-fuel ratio—) and then the difference of the estimated air-fuel ratio relative to the detected air-fuel ratio (i.e. the air-fuel ratio detected by the air-fuel ratio sensor) is calculated. Then, this difference is divided into the air-fuel ratio difference which may occur due to the fuel injection amount difference (i.e. the difference between the actual and commanded fuel injection amounts) and the air-fuel ratio difference which may occur due to the intake air amount difference (i.e. the difference between the actual and detected intake air amounts). Then, the commanded fuel injection amount is amended for compensating the above-explained divided air-fuel ratio difference which may occur due to the fuel injection amount difference and the detected intake air amount is amended for compensating the above-explained divided air-fuel ratio difference which may occur due to the intake air amount difference.

PRIOR ART DOCUMENTS

Patent Document

[Patent Document 1] Unexamined Japanese Patent Publication No. 2007-262946
[Patent Document 2] Unexamined Japanese Patent Publication No. 6-299886

DISCLOSURE OF THE INVENTION

Problems to be Solved by the Invention

In the engine described in the Patent Document 1, while the engine is driven, variously changing the commanded fuel injection amount, the rate of the air-fuel ratio difference occurring due to the fuel injection amount difference relative to the total air-fuel ratio difference (i.e. the difference of the estimated air-fuel ratio relative to the detected air-fuel ratio) and the rate of the air-fuel ratio difference occurring due to the intake air amount difference relative to the total air-fuel ratio difference are previously obtained and the rates are stored in the electronic control unit as a map as a function of the commanded fuel injection amount. Then, during the engine operation, the rate of the air-fuel ratio difference occurring due to the fuel injection amount difference and the rate of the air-fuel ratio difference occurring due to the intake air amount difference are acquired from the map on the basis of the commanded fuel injection amount. Then, the air-fuel ratio difference calculated during the engine operation is divided into the air-fuel ratio difference occurring due to the fuel injection amount difference and the air-fuel ratio difference occurring due to the intake air amount difference, using the acquired rates and the commanded fuel injection amount and the detected intake air amount are amended for compensating the divided air-fuel ratio differences.

According to the technique described in the Patent Document 1, the rates for dividing the total air-fuel ratio difference into the air-fuel ratio occurring due to the fuel injection amount difference and the air-fuel ratio occurring due to the intake air amount difference are obtained, using a reference engine (in particular, reference fuel injectors, a reference air flow meter, a reference air-fuel ratio sensor, etc.). Therefore, in consideration of the manufacturing error of the engine, the rates obtained using the reference engine may not be appropriate to the individual engines. Further, when the aged deterioration of the individual engines (in particular, the aged deterioration of the fuel injectors, air flow meters, air-fuel ratio sensors, etc.) occurs, the rates obtained using the reference engine may not be appropriate to the individual engines.

In these cases, the amendment of the commanded fuel injection amount may be excessively large or small relative to the difference of the commanded fuel injection amount relative to the actual fuel injection amount and the amendment of the detected intake air amount may be excessively large or small relative to the difference of the detected intake air amount relative to the actual intake air amount.

The object of the invention is to amend the fuel supply command value appropriately relative to the difference of the commanded fuel supply amount relative to the actual fuel supply amount and amend the detected supplied air amount appropriately relative to the difference of the detected supplied air amount relative to the actual supplied air amount.

Means for Solving the Problems

The invention of this application relates to a control device of an engine, comprising:
means for supplying a fuel to a combustion chamber;
means for setting an amount of the fuel to be supplied to the combustion chamber by the fuel supplying means to a target fuel supply amount;
means for calculating on the basis of the target fuel supply amount a fuel supply command value for making the fuel supplying means supply the fuel of the target fuel supply amount set by the target fuel supply amount setting means to the combustion chamber and providing the fuel supply command value to the fuel supplying means;
means for detecting an amount of an air supplied to the combustion chamber;
means for detecting an air-fuel ratio of a mixture gas formed in the combustion chamber;
means for calculating an air-fuel ratio of the mixture gas formed in the combustion chamber on the basis of the fuel supply amount grasped from the fuel supply command value and the amount of the air detected by the supplied air amount detection means;
means for detecting a concentration of a specified component included in an exhaust gas discharged from the combustion chamber; and
means for calculating the concentration of the specified component included in the exhaust gas discharged from the combustion chamber on the basis of the fuel supply amount grasped from the fuel supply command value and the amount of the air detected by the supplied air amount detection means.

It should be noted that in this invention, any fuel supplying means for supplying the fuel to the combustion chamber can be employed and for example, a fuel injector for supplying the fuel to the combustion chamber by injecting the fuel directly to the interior of the combustion chamber of the engine or a fuel injector for supplying the fuel to the combustion chamber by injecting the fuel to an intake port of the engine can be employed. Further, in this invention, the exhaust gas component concentration detection means includes means for detecting an amount of the specified component included in the exhaust gas discharged from the combustion chamber.

In this invention, the fuel supply command value or the fuel supply amount grasped therefrom is amended and the amount of the air detected by the supplied air amount detection means is amended such that the difference between the air-fuel ratio detected by the air-fuel ratio detection means and the air-fuel ratio calculated by the air-fuel ratio calculation means and the difference between the concentration of the specified component detected by the exhaust gas component concentration detection means and the concentration of the specified component calculated by the exhaust gas component concentration calculation means become small.

According to this invention, the fuel supply command value or the fuel supply amount grasped therefrom is amended appropriately, regarding the difference of the commanded fuel supply amount (i.e. the fuel supply amount grasped from the fuel supply command value) relative to the actual fuel supply amount (i.e. the amount of the fuel actually supplied to the combustion chamber by the fuel supplying means) and the detected supplied air amount is amended appropriately, regarding the difference of the detected supplied air amount (i.e. the amount of the air detected by the supplied air amount detection means) relative to the actual supplied air amount (i.e. the amount of the air actually supplied to the combustion chamber by the air supply means). Below, the reasons thereof will be explained.

In this invention, the commanded fuel supply amount and the detected supplied air amount are considered in the calculation of the air-fuel ratio by the air-fuel ratio calculation means. Therefore, the commanded fuel supply amount and the detected supplied air amount are considered in the difference between the air-fuel ratio detected by the air-fuel ratio detection means (hereinafter, this air-fuel ratio will be referred to as—detected air-fuel ratio—) and the air-fuel ratio calculated by the air-fuel calculation means (hereinafter, this air-fuel ratio will be referred to as—calculated air-fuel ratio—). On the other hand, the commanded fuel supply amount and the detected supplied air amount are considered in the calculation of the concentration of the specified component by the exhaust gas component concentration calculation means. Therefore, the commanded fuel supply amount and the detected supplied air amount are considered in the difference between the concentration of the specified component detected by the exhaust gas component concentration detection means (hereinafter, this concentration will be referred to as—detected specified component concentration) and the concentration of the specified component calculated by the exhaust gas component concentration calculation means (hereinafter, this concentration will be referred to as—calculated specified component Concentration—).

That is, in this invention, the commanded fuel supply amount and the detected supplied air amount are considered in the difference between the detected air-fuel ratio and the calculated air-fuel ratio as well as in the difference between the detected specified component concentration and the calculated specified component concentration. Further, when the difference occurs between the commanded fuel supply amount and the actual fuel supply amount, the commanded fuel supply amount reflects this difference and when the difference occurs between the detected supplied air amount and the actual supplied air amount, the detected supplied air amount reflects this difference. Further, the difference of the commanded fuel supply amount relative to the actual fuel supply amount and the difference of the detected supplied air amount relative to the actual supplied air amount become small by amending the commanded fuel supply amount (i.e. the fuel supply command value) and the detected supplied air amount such that the above-mentioned differences become small.

In this regard, in this invention, two parameters such as the commanded fuel supply amount and the detected supplied air amount, the properties of which are different from each other, are amended and two regulations, the properties of which are different from each other, are employed as those for regulating the amendment of the parameters, such as a regulation for decreasing the difference between the detected air-fuel ratio and the calculated air-fuel ratio and a regulation for decreasing the difference between the detected specified component concentration and the calculated specified component concentration. That is, in this invention, the two regulations are employed for the amendment of the two parameters. Therefore, the fuel supply command value (or the fuel supply amount grasped therefrom) is amended appropriately, regarding the difference of the commanded fuel supply amount relative to the actual fuel supply amount and the detected supplied air amount is amended appropriately, regarding the difference of the detected supplied air amount relative to the actual supplied air amount by amending the fuel supply command value (or the fuel supply amount grasped therefrom) and the detected supplied air amount according to this invention.

Further, the above-mentioned specified component may be any component as far as the concentration thereof changes in response to the amount of the fuel supplied to the combustion chamber and the amount of the air supplied to the combustion chamber, and for example, may be unburned hydrocarbon (unburned HC) or carbon monoxide (CO). In this regard, the amount of nitrogen oxide (NOx) produced by the combustion of the fuel in the combustion chamber (hereinafter, this amount will be referred to as—NOx production amount—) is largely affected by the fuel supply amount and the supplied air amount. That is, the sensitivity of the NOx production amount relative to the difference of the commanded fuel supply amount relative to the actual fuel supply amount and the sensitivity of the NOx production amount relative to the difference of the detected supplied air amount relative to the actual supplied air amount are high. Therefore, in the above-explained invention which uses the difference between the detected exhaust gas component concentration and the calculated exhaust gas component concentration for the amendment of the fuel supply command value and the detected supplied air amount, it is preferred that the above-mentioned specified component is the nitrogen oxide included in the exhaust gas in terms of the appropriate assured amendment of the fuel supply command value and the detected supplied air amount.

Further, in the above-explained invention, when an amendment value for compensating the difference regarding the amount of the fuel supplied by the fuel supplying means will be referred to as fuel supply amount amendment value and an amendment value for compensating the difference regarding the amount of the air detected by the supplied air amount detection means will be referred to as supplied air amount amendment value, an equation existed between the air-fuel ratio detected by the air-fuel ratio detection means and the air-fuel ratio calculated by the air-fuel ratio calculation means and an equation existed between the concentration of the specified component detected by the exhaust gas component concentration detection means and the concentration of the specified component calculated by the exhaust gas component concentration calculation means may be constituted by using the fuel supply amount amendment value and the supplied air amount amendment value, the fuel supply amount amendment value and the supplied air amount amendment value may be calculated by solving a simultaneous equation consisting of these two equations, the difference between the air-fuel ratio detected by the air-fuel ratio detection means and the air-fuel ratio calculated by the air-fuel ratio calculation means and the difference between the concentration of the specified component detected by the exhaust gas component concentration detection means and the concentration of the specified component calculated by the exhaust gas component concentration calculation means may be decreased by amending the fuel supply command value or the fuel supply amount grasped therefrom by the calculated fuel supply amount amendment value and by amending the amount of the air detected by the supplied air amount detection means by the calculated supplied air amount amendment value.

Further, in the above-explained invention, a possible range of an amendment amount for the fuel supply command value when no malfunction occurs in the fuel supplying means, may be set to a fuel supply command value amendment allowed range, and it may be diagnosed that a malfunction occurs in the fuel supplying means when the amendment amount for the fuel supply command value is not within the fuel supply command value amendment allowed range.

As explained above, according to the above-explained invention, the fuel supply command value is amended appropriately, regarding the difference of the commanded fuel supply amount relative to the actual fuel supply amount. Therefore, the amendment amount for the fuel supply command value exactly indicates the difference of the commanded fuel supply amount relative to the actual fuel supply amount. Therefore, the malfunction of the fuel supplying means can be exactly diagnosed by diagnosing the malfunction of the fuel supply means on the basis of the amendment amount for the fuel supply command value.

Further, in the above-explained invention, a possible range of an amendment amount for the detected supplied air amount when no malfunction occurs in the supplied air amount detection means, may be set to a detected supplied air amount amendment allowed range and it may be diagnosed that a malfunction occurs in the supplied air amount detection means when the amendment amount for the detected supplied air amount is not within the detected supplied air amount amendment allowed range.

As explained above, according to the above-explained invention, the detected supplied air amount is amended appropriately, regarding the difference of the detected supplied air amount relative to the actual supplied air amount. Therefore, the amendment amount for the detected supplied air amount exactly indicates the difference of the detected supplied air amount relative to the actual supplied air amount. Therefore, the malfunction of the supplied air amount detection means can be exactly diagnosed by diagnosing the malfunction of the supplied air amount detection means on the basis of the amendment amount for the detected supplied air amount.

MODE FOR CARRYING OUT THE INVENTION

Figure 1:
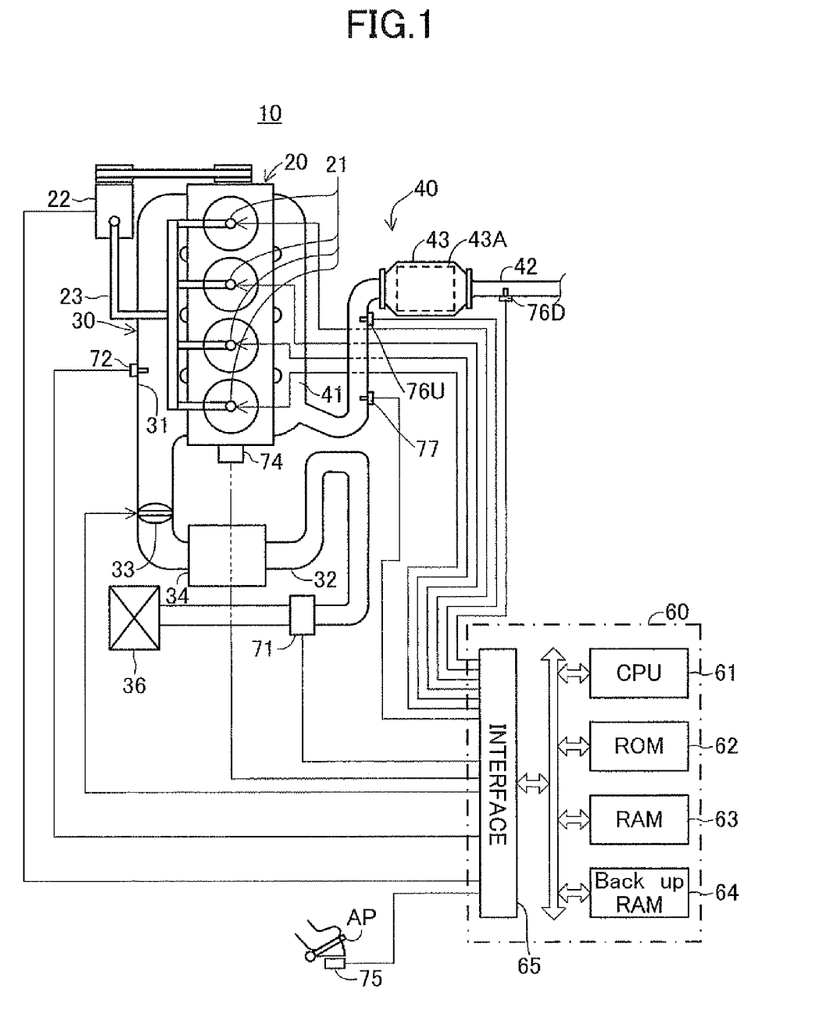
FIG. 1 is a view showing an engine which the control device of the invention is applied.

Below, an embodiment of the control device of the engine of the invention will be explained, referring to the drawings. The engine which the control device of the invention is applied, is shown in FIG. 1. The engine 10 shown in FIG. 1 comprises a body 20 of the engine (hereinafter, the body will be referred to as—engine body—), fuel injectors 21 positioned corresponding to four combustion chambers of the engine body, respectively and a fuel pump 22 for supplying a fuel to the fuel injectors 21 via a fuel supply pipe 23. Further, the engine 10 comprises an intake system 30 for supplying an air to the combustion chambers from the outside air and an exhaust system 40 for discharging the exhaust gas discharged from the combustion chambers to the outside air. Further, the engine 10 is a compression-ignition type engine (so-called diesel engine).

The intake system 30 has an intake manifold 31 and an intake pipe 32. It should be noted that in the following explanation, the intake system 30 may be referred to as—intake passage—. One end of the intake manifold 31 (i.e. the branch portions) is connected to intake ports (not shown) formed in the engine body 20, corresponding to each combustion chamber. On the other hand, the other end of the intake manifold 31 is connected to the intake pipe 32. A throttle valve 33 for controlling an amount of an air flowing through the intake pipe is positioned in the intake pipe 32. Further, an intercooler 34 for cooling the air flowing through the intake pipe is positioned on the intake pipe 32. Further, an air cleaner 36 is positioned at an end of the intake pipe 32 facing the outside air.

On the other hand, the exhaust system 40 has an exhaust manifold 41 and an exhaust pipe 42. It should be noted that in the following explanation, the exhaust system 40 may be referred to as—exhaust passage—. One end of the exhaust manifold 41 (i.e. the branch portions) is connected to exhaust ports (not shown) formed in the engine body 20, corresponding to each combustion chamber. On the other hand, the other end of the exhaust manifold 41 is connected to the exhaust pipe 42. A catalyst converter 43 including therein an exhaust gas purification catalyst 43A for purifying a specified component included in the exhaust gas, is positioned on the exhaust pipe 42.

Further, an oxygen concentration sensor (hereinafter, this oxygen concentration sensor will be referred to as—upstream oxygen concentration sensor) 76U for outputting an output value corresponding to the oxygen concentration of the exhaust gas discharged from the combustion chamber is mounted on the exhaust pipe 42 upstream of the exhaust gas purification catalyst 43A. On the other hand, an oxygen concentration sensor (hereinafter, this oxygen concentration sensor will be referred to as—downstream oxygen concentration sensor) 76D for outputting an output value corresponding to the oxygen concentration of the exhaust gas flowing out of the exhaust gas purification catalyst 43A is mounted on the exhaust pipe 42 downstream of the exhaust gas purification catalyst 43A.

Further, a sensor 77 for outputting an output value corresponding to the concentration of a NOx (nitrogen oxide) included in the exhaust gas discharged from the combustion chamber (hereinafter, this sensor will be referred to as—NOx sensor) is mounted on the exhaust pipe 42 upstream of the exhaust gas purification catalyst 43A.

Further, an air flow meter 71 for outputting an output value corresponding to a flow rate of the air flowing through the intake pipe (i.e. a flow rate of the air sucked into the combustion chambers and hereinafter, this flow rate will be referred to as—intake air amount—), is mounted on the intake pipe 32 downstream of the air cleaner 36. Further, a pressure sensor (hereinafter, referred to as—intake pressure sensor—) 72 for outputting an output value corresponding to a pressure (i.e. an intake pressure) of the gas in the intake manifold, is mounted on the intake manifold 31. Further, a crank position sensor 74 for outputting an output value corresponding to a rotation phase of a crank shaft is mounted on the engine body 20.

Further, the engine 10 comprises an electronic control unit 60. The electronic control unit 60 has a microprocessor (CPU) 61, a read only memory (ROM) 62, a random access memory (RAM) 63, a back-up RAM (Back up RAM) 64 and an interface 65. The fuel injectors 21, the fuel pump 22 and the throttle valve 33 are connected to the interface 65 and the control signals for controlling the operation thereof are provided from the electronic control unit 60 via the interface 65. Further, the air flow meter 71, the intake pressure sensor 72, the crank position sensor 74, an acceleration pedal opening degree sensor 75 for outputting an output value corresponding to the opening degree of an acceleration pedal AP (i.e. the depression degree of the acceleration pedal AP and hereinafter, and this will be referred to as—acceleration pedal opening degree—), the upstream oxygen concentration sensor 76U, the downstream oxygen concentration sensor 76D and the NOx sensor 77 are connected to the interface 65 and the output values output from the air flow meter 71, the intake pressure sensor 72, the crank position sensor 74, the acceleration pedal opening degree sensor 75, the upstream oxygen concentration sensor 76U, the downstream oxygen concentration sensor 76D and the NOx sensor 77 are input to the interface 65.

It should be noted that the electronic control unit 60 calculates the intake air amount on the basis of the output value of the air flow meter 71, the intake pressure on the basis of the output value of the intake pressure sensor 72, the engine speed (i.e. the speed of the engine) on the basis of the output value of the crank position sensor 74, the acceleration pedal opening degree on the basis of the output value of the acceleration pedal opening degree sensor 75, the air-fuel ratio of the exhaust gas discharged from the combustion chamber before flowing into the exhaust gas purification catalyst 43A (i.e. the air-fuel ratio of a mixture gas formed in the combustion chambers) on the basis of the output value of the upstream oxygen concentration sensor 76U and the air-fuel ratio of the exhaust gas flowing out of the exhaust gas purification catalyst 43A on the basis of the output value of the downstream oxygen sensor 76D. It should be noted that the upstream oxygen concentration sensor 76U detects the air-fuel ratio of the mixture gas formed in the combustion chambers and therefore, in the following explanation, the upstream oxygen concentration sensor will be simply referred to as—air-fuel ratio sensor—.

Next, the embodiment of the controls of the invention will be explained. It should be noted that in the following explanation, the "engine operation" means the "operation of the engine", the "fuel injection amount" means the "amount of the fuel injected from the fuel injector" and the "actual fuel injection amount" means the "amount of the fuel actually injected from the fuel injector".

Figure 2:
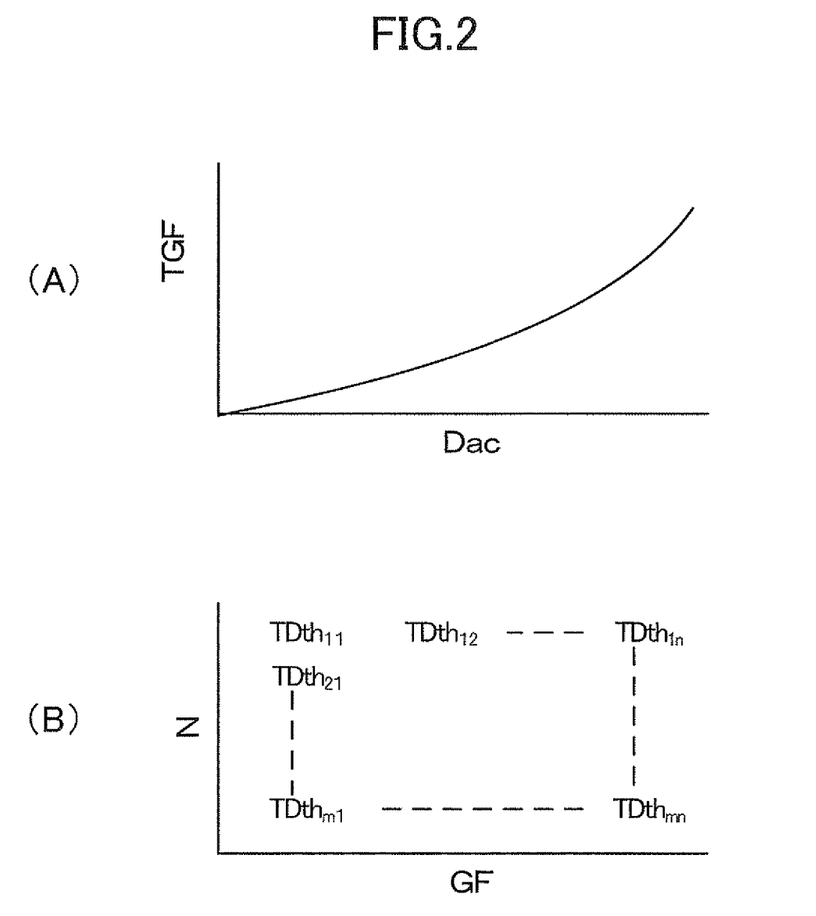
FIG. 2(A) is a view showing a map used for acquiring a target fuel injection amount TGF on the basis of an acceleration pedal opening degree Dac and FIG. 2(B) is a view showing a map used for acquiring a target throttle opening degree on the basis of an engine speed and a fuel injection amount Gf.

One embodiment of the control of the fuel injector of the invention will be explained. In one embodiment of the invention, the appropriate fuel injection amounts corresponding to the various acceleration pedal opening degrees are previously obtained by the experiment, etc. and are stored in the electronic control unit as target fuel injection amounts TGF in the form of a map as a function of the acceleration pedal opening degree Dac as shown in FIG. 2(A). During the engine operation, the target fuel injection amount TGF corresponding to the acceleration pedal opening degree Dac is acquired from the map of FIG. 2(A). Then, an opening time of the fuel injector necessary to make the fuel injector inject the acquired target fuel injection amount TGF of the fuel (hereinafter, this opening time will be referred to as—target opening time—) is calculated. Then, a command value for opening the fuel injector for the calculated opening time (hereinafter, this command value will be referred to as—fuel injection command value—) is provided to the fuel injector.

Next, an embodiment of the invention regarding the control of the throttle valve will be explained. In one embodiment of the invention, the appropriate throttle valve opening degrees (i.e. the opening degree of the throttle valve) corresponding to the various fuel injection amounts and the various engine speeds in the engine shown in FIG. 1 are previously obtained by an experiment, etc. and are stored in the electronic control unit as the target throttle valve opening degrees TDth in the form of a map as a function of the fuel injection amount GF and the engine speed N as shown in FIG. 2(B). During the engine operation, the target throttle valve opening degree TDth is acquired from the map of FIG. 2(B) on the basis of the fuel injection amount GF and the engine speed N. Then, the throttle valve is controlled such that the throttle valve opens by the acquired target throttle valve opening degree TDth. It should be noted that in the map of the FIG. 2(B), the target throttle valve opening degree TDth becomes large as the fuel injection amount GF becomes large and as the engine speed N becomes large. Further, in this embodiment, the target fuel injection amount TGF (i.e. the target fuel injection amount TGF acquired from the map of FIG. 2(A)) is employed as the fuel injection amount GF used for acquiring the target throttle valve opening degree TDth from the map of FIG. 2(B).

Next, an embodiment of the amendment of the fuel injection command value of the invention will be explained. In one embodiment of the invention, using a fuel injector having a standard property (hereinafter, this fuel injector will be referred to as—base fuel injector—) as a base, a function for calculating the fuel injection command value for injecting the target fuel injection amount of the fuel from the base fuel injector is previously obtained by an experiment, etc. and during the engine operation, the fuel injection command value is calculated by applying the target fuel injection amount to the function. Therefore, as far as the property of the fuel injector corresponds to that of the base fuel injector, when the fuel injection command value calculated by the above-mentioned function is provided to the fuel injector, the fuel of the target fuel injection amount is injected from the fuel injector. That is, the actual fuel injection amount corresponds to the target fuel injection amount. However, in the case that the property of the fuel injector does not correspond to that of the base fuel injector due to the manufacturing error of the fuel injector or in the case that the property of the injector becomes different from that of the base fuel injector due to the time degradation of the fuel injector, even when the fuel injection command value calculated by the above-mentioned function is provided to the fuel injector, the fuel of the target fuel injection amount is not injected from the fuel injector. That is, the actual fuel injection amount does not correspond to the target fuel injection amount.

In one embodiment of the invention, during the engine operation, a fuel injection amount amendment value (the details thereof will be explained below) which indicates the difference of the actual fuel injection amount relative to the target fuel injection amount is calculated, the fuel injection command value is amended by multiplying the fuel injection command value calculated by the function by the inverse of the calculated fuel injection amount amendment value and the amended fuel injection command value is provided to the fuel injector as the final fuel injection command value. Thereby, the actual fuel injection amount becomes equal to the target fuel injection amount or at least becomes close to the target fuel injection amount.

It should be noted that the fuel injection command value amended according to the invention may be used to make the actual fuel injection amount become close to the target fuel injection amount as well as being used to grasp the fuel injection amount in the case that the engine performs a control using the fuel injection amount as a parameter.

Next, an embodiment of the amendment of the detected intake air amount of the invention will be explained. In one embodiment of the invention, using an air flow meter having a standard property (hereinafter, this air flow meter will be referred to as—base air flow meter—) as a base, a function for converting the output value of the air flow meter to the actual intake air amount is previously obtained by an experiment, etc. and during the engine operation, the intake air amount is calculated as the detected intake air amount by applying the output value of the air flow meter to the function. Therefore, as far as the property of the air flow meter corresponds to that of the base air flow meter, the detected intake air amount calculated by the above-mentioned function corresponds to the actual intake air amount. However, in the case that the property of the air flow meter does not correspond to that of the base air flow meter due to the manufacturing error of the air flow meter or in the case that the property of the air flow meter becomes different from that of the base air flow meter due to the time degradation of the air flow meter, the detected intake air amount calculated by the above-mentioned function does not correspond to the actual intake air amount.

In one embodiment of the invention, during the engine operation, an intake air amount amendment value (the details thereof will be explained below) which indicates the difference of the detected intake air amount relative to the actual intake air amount is calculated, the detected intake air amount is amended by multiplying the detected intake air amount calculated by the above-mentioned function by the calculated intake air amount amendment value and the amended detected intake air amount is employed as the final detected intake air amount. Thereby, the detected intake air amount becomes equal to the actual intake air amount or at least becomes close to the actual intake air amount.

It should be noted that the detected intake air amount amended according to the invention is, for example, used in the case that the engine performs a control using the detected intake air amount as a parameter.

Next, an embodiment of the calculation of the fuel injection amount and intake air amount amendment values of the invention will be explained. In one embodiment of the invention, during the engine operation, an instantaneous value XFI of the fuel injection amount amendment value and an instantaneous value XAI of the intake air amount amendment value are calculated by solving a simultaneous equation consisting of the following equations 1 and 2. In the equation 1, "AFd" is—the detected air-fuel ratio (i.e. the air-fuel ratio of the mixture gas detected by the air-fuel ratio sensor) and "AFe" is—the estimated air-fuel ratio—. In the equation 2, "NOXd" is—the detected NOx concentration—, "Fnox" is—a model or function for calculating the NOx concentration of the exhaust gas on the basis of the fuel injection amount and the intake air amount—, "GFe" is—the commanded fuel injection amount (i.e. the fuel injection amount grasped from the fuel injection command value calculated on the basis of the latest target fuel injection amount)—and "GAd" is—the detected intake air amount—.

$$AFd = AFe \times XAI/XFI \qquad (1)$$

$$NOXd = Fnox(GFe \times XFI, GAd \times XAI) \qquad (2)$$

It should be noted that the estimated air-fuel ratio AFe used in the equation 1 is calculated according to the following equation 3. In the equation 3, "GAd" is—the detected intake air amount—and "GFe" is—the commanded fuel injection amount (i.e. the fuel injection amount grasped from the fuel injection command value calculated on the basis of the latest target fuel injection amount).

$$AFe = GAd/GFe \qquad (3)$$

Then, the fuel injection amount amendment value XF is calculated according to the following equation 4 and the intake air amount amendment value XA is calculated according to the following equation 5. It should be noted that in the equation 4, "XFG" is—the learning value of the fuel injection amount amendment value acquired corresponding to the present engine operation condition—and "XFI" is—the instantaneous value of the latest calculated fuel injection amount amendment value—. In the equation 5, "XAG" is—the learning value of the fuel injection amount amendment value acquired corresponding the present engine operation condition—and "MI" is—the instantaneous value of the latest calculated intake air amount amendment value—.

$$XF=XFG+XFI \quad (4)$$

$$XA=XAG+XAI \quad (5)$$

It should be noted that when the fuel injection amount amendment value is newly calculated, the newly calculated fuel injection amount amendment value is stored in the electronic control unit as the learning value of the fuel injection amendment value corresponding to the present engine operation condition. That is, the learning value of the fuel injection amount amendment value corresponding to the present engine operation condition is updated. Further, when the intake air amount amendment value is newly calculated, the newly calculated intake air amount amendment is stored in the electronic control unit as the learning value of the intake air amount amendment value corresponding to the present engine operation condition. That is, the learning value of the intake air amount amendment value corresponding to the present engine operation condition is updated.

Next, the reason that the actual fuel injection amount becomes equal to the target fuel injection amount (or the actual fuel injection amount becomes close to the target fuel injection amount) by amending the fuel injection command value by the fuel injection amount amendment value calculated as explained above and the detected intake air amount becomes equal to the actual intake air amount (or the detected intake air amount becomes close to the actual intake air amount) by amending the detected intake air amount by the intake air amount amendment value calculated as explained above, will be explained.

When indicating the actual intake air amount by "GAa" and the detected intake air amount by "GAd", as shown in the following equation 6, it is defined that the value XA obtained by dividing the actual intake air amount by the detected intake air amount is the intake air amount detection difference (i.e. the difference of the detected intake air amount relative to the actual intake air amount). Further, when indicating the actual fuel injection amount "GFa" and the commanded fuel injection amount (i.e. the fuel injection amount grasped from the fuel injection command value calculated on the basis of the latest target fuel injection amount) by "GFe", as shown in the following equation 7, it is defined that the value XF obtained by dividing the actual fuel injection amount by the target fuel injection amount is the fuel injection amount difference (i.e. the difference of the actual fuel injection amount relative to the target fuel injection amount). Further, when indicating the detected intake air amount by "GAd" and the commanded fuel injection amount by "GFe", as shown in the following equation 8, the value AF obtained by dividing the detected intake air amount by the commanded fuel injection amount is the estimated air-fuel ratio. Further, when indicating the commanded fuel injection amount by "GFe" and the detected intake air amount by "GAd", it is defined that the value NOXe calculated according to the following equation 9 is "the estimated NOx concentration".

$$XA=GAa/GAd \quad (6)$$

$$XF=GFa/GFe \quad (7)$$

$$AFe=GAd/GFe \quad (8)$$

$$NOXe=Fnox(GFe,GAd) \quad (9)$$

In the case that the intake air amount detection difference XA, the fuel injection amount difference XF, the estimated air-fuel ratio AFe and the estimated NOx concentration NOXe are defined as explained above, the following equation 10 exists between the actual air-fuel ratio AFa and the estimated air-fuel ratio AFe and the following equation 11 exists between the detected NOx concentration (i.e. the actual NOx concentration) NOXd and the estimated NOx concentration NOXe.

$$AFa=AFe \times XA/XF \quad (10)$$

$$NOXd=Fnox(GFe \times XF, GAd \times XA) \quad (11)$$

Therefore, the fuel injection amount difference XF and the intake air amount detection difference XA can be calculated by solving a simultaneous equation consisting of the equations 10 and 11. In this regard, the equations 10 and 11 correspond to the equations 1 and 2, respectively, and therefore the fuel injection amount difference XF obtained by solving the simultaneous equation consisting of the equations 10 and 11 (i.e. the simultaneous equation consisting of the equations 1 and 2) is the amendment value for making the actual fuel injection amount equal to the target fuel injection amount (i.e. the fuel injection amount amendment value) and the intake air amount detection difference XA obtained by solving the simultaneous equation consisting of the equations 10 and 11 (i.e. the simultaneous equation consisting of the equations 1 and 2) is the amendment value for making the detected intake air amount equal to the actual intake air amount (i.e. the intake air amount amendment value).

According to the above-explained embodiment, the fuel injection command value is amended appropriately relative to the fuel injection amount difference of the fuel injector and the detected intake air amount is amended appropriately relative to the detected intake air amount difference of the air flow meter. Below, the reason thereof will be explained.

The above equation 1 is an equation existing between the detected and estimated air-fuel ratios and the above equation 2 is an equation existing between the detected and estimated NOx concentrations. Therefore, the properties of the equations are different from each other. Further, the estimated air-fuel ratio of the above equation 1 is calculated by using the commanded fuel injection amount and the detected intake air amount and the estimated NOx concentration of the above equation 2 is also calculated by using the commanded fuel injection amount and the detected intake air amount. The commanded fuel injection amount and the detected intake air amount are parameters which have different properties from each other. In the above-explained embodiment, two equations having the different properties from each other are employed for the calculation of the amendment values for amendment two parameters having the different properties from each other. That is, it can be said that the above equations 1 and 2 regulate the fuel injection amount and intake air amount amendment values and therefore, in the above-explained embodiment, two regulations having the different properties from each other are employed for the calculation of the amendment values for amending two parameters having different properties from each other. Therefore, the fuel injection command value is amended appropriately relative to the fuel injection amount difference of the fuel injector and the detected intake air amount is amended appropriately relative to the detected intake air amount difference of the air flow meter by amending the fuel injection command value and the detected intake air amount by the fuel injection amount amendment value and the intake air amount amendment value calculated according to the above-explained embodiment.

Further, when only fuel injection amount is amended, the output torque of the engine changes largely. However, according to the above-explained embodiment, the fuel injection amount as well as the intake air amount are amended. Therefore, the large change of the output torque of the engine is restricted.

It should be noted that in the above-explained embodiment, the fuel injection amount and intake air amount amendment values calculated by solving the simultaneous equation consisting of the above equations 1 and 2 are those which make the difference between the detected air-fuel ratio and the estimated air-fuel ratio and the difference between the detected NOx concentration and the estimated NOx concentration become "0" or at least small.

Figure 3:
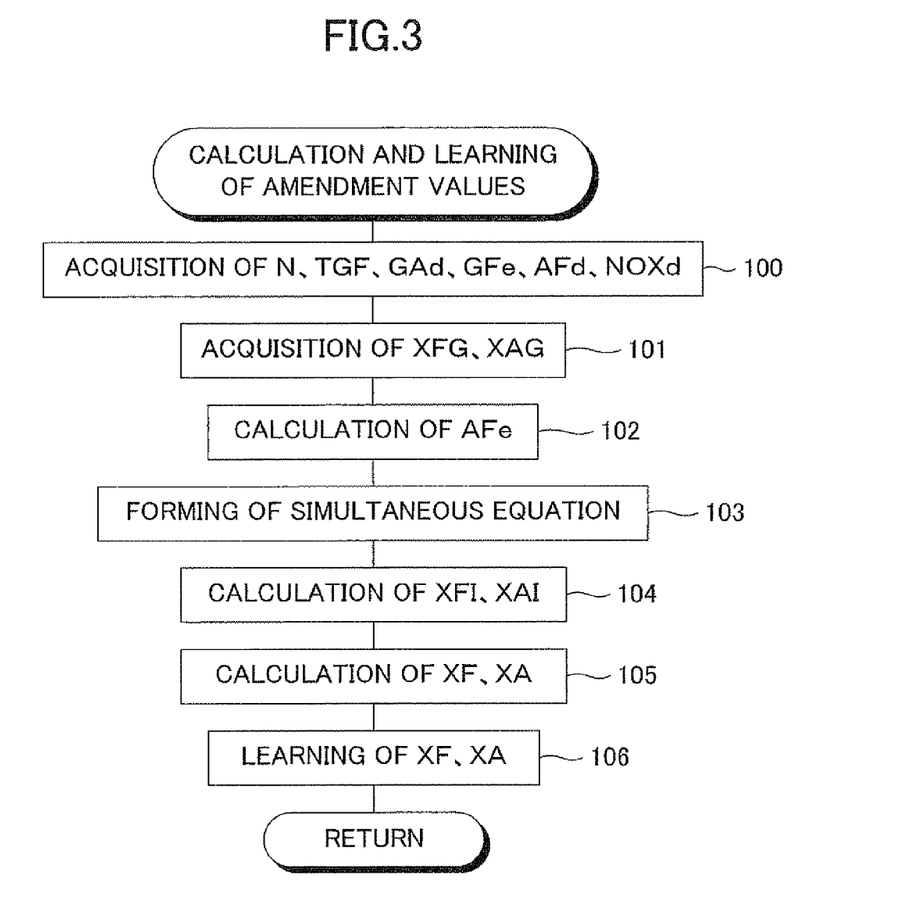
FIG. 3 is a view showing an example of a routine for performing a calculation and a learning of a fuel injection amount amendment value and an intake air amount amendment value according to the invention.

Next, an example of the routine for performing the calculation and the learning of the fuel injection amount and intake air amount amendment values of the invention will be explained. The example of the routine is shown in FIG. 3. It should be noted that the routine is performed every a predetermined time has elapsed.

When the routine of FIG. 3 starts, at the step 100, the engine speed N, the target fuel injection amount TGF, the detected intake air amount GAd, the commanded fuel injection amount GFe, the detected air-fuel ratio AFd and the detected NOx concentration NOXd are acquired. Next, at the step 101, the learning value XFG of the fuel injection amount amendment value and the learning value XAG of the intake air amount amendment value corresponding to the engine operation condition defined by the engine speed N and the target fuel injection amount TGF acquired at the step 100 are acquired. Next, at the step 102, the estimated air-fuel ratio AFe is calculated by applying the detected intake air amount GAd and the commanded fuel injection amount GFe acquired at the step 100 to the above equation 3. Next, at the step 103, the simultaneous equation is formed by applying the estimated air-fuel ratio AFe calculated at the step 102 to the above equation 1 and applying the detected intake air amount GAd and the commanded fuel injection amount GFe acquired at the step 100 to the above equation 2. Next, at the step 104, the instantaneous value XFI of the fuel injection amount and the instantaneous value XAI of the intake air amount amendment value are calculated by solving the simultaneous equation formed at the step 103. Next, at the step 105, the fuel injection amount amendment value XF is calculated by applying the learning value XFG of the fuel injection amount amendment value acquired at the step 101 and the instantaneous value XFI of the fuel injection amount amendment value calculated at the step 104 to the above equation 4 and the intake air amount amendment value XA is calculated by applying the learning value XAG of the intake air amount amendment value acquired at the step 101 and the instantaneous value XAI of the intake air amount amendment value calculated at the step 104 to the above equation 5. Next, at the step 106, the fuel injection amount and the intake air amount amendment values XF and XA calculated at the step 105 are stored in the electronic control unit as the learning values XFG and XAG of the fuel injection amount and intake air amount amendment values, respectively, corresponding to the engine operation condition defined by the engine speed N and the target fuel injection amount TGF acquired at the step 100 (i.e. the fuel injection amount and intake air amount amendment values XF and XA are learned) and then the routine is terminated.

In the above-explained embodiment, the range of the possible learning value of the fuel injection amount amendment value when no malfunction of the fuel injector occurs, may be previously set and it may be diagnosed that the malfunction of the fuel injector occurs when the learning value of the fuel injection amount amendment value is not within the previously set range. Thereby, the malfunction of the fuel injector can be exactly diagnosed. That is, the learning value of the fuel injection amount amendment value indicates the fuel injection amount difference of the fuel injector exactly. Therefore, the malfunction of the fuel injector can be exactly diagnosed by performing the malfunction diagnosis of the fuel injector, using the learning value of the fuel injection amount amendment value which is a parameter exactly indicating the fuel injection amount difference of the fuel injector. Further, the learning value of the fuel injection amount amendment value reflects the decrease of the exhaust gas emission property. Therefore, by performing the malfunction diagnosis of the fuel injector, using the learning value of the fuel injection amount amendment value which is a parameter reflected by the decrease of the exhaust gas emission property, the malfunction of the fuel injector can be exactly diagnosed even when the exhaust gas emission property is decreased and then the malfunction of the fuel can be assuredly diagnosed before the degree of the malfunction of the fuel injector becomes large.

Further, in the above-explained embodiment, the range of the possible learning value of the intake air amount amendment value when no malfunction of the air flow meter occurs, may be previously set and it may be diagnosed that the malfunction of the air flow meter occurs when the learning value of the intake air amount amendment value is not within the previously set range. Thereby, the malfunction of the air flow meter can be exactly diagnosed. That is, the learning value of the intake air amount amendment value indicates the detected intake air amount difference of the air flow meter exactly. Therefore, the malfunction of the air flow meter can be exactly diagnosed by performing the malfunction diagnosis of the air flow meter, using the learning value of the intake air amount amendment value which is a parameter exactly indicating the detected intake air amount difference of the air flow meter. Further, the learning value of the intake air amount amendment value reflects the decrease of the exhaust gas emission property. Therefore, by performing the malfunction diagnosis of the air flow meter, using the learning value of the intake air amount amendment value which is a parameter reflected by the decrease of the exhaust gas emission property, the malfunction of the air flow meter can be exactly diagnosed even when the exhaust gas emission property is decreased and then the malfunction of the air flow meter can be assuredly diagnosed before the degree of the malfunction of the air flow meter becomes large.

Figure 4:
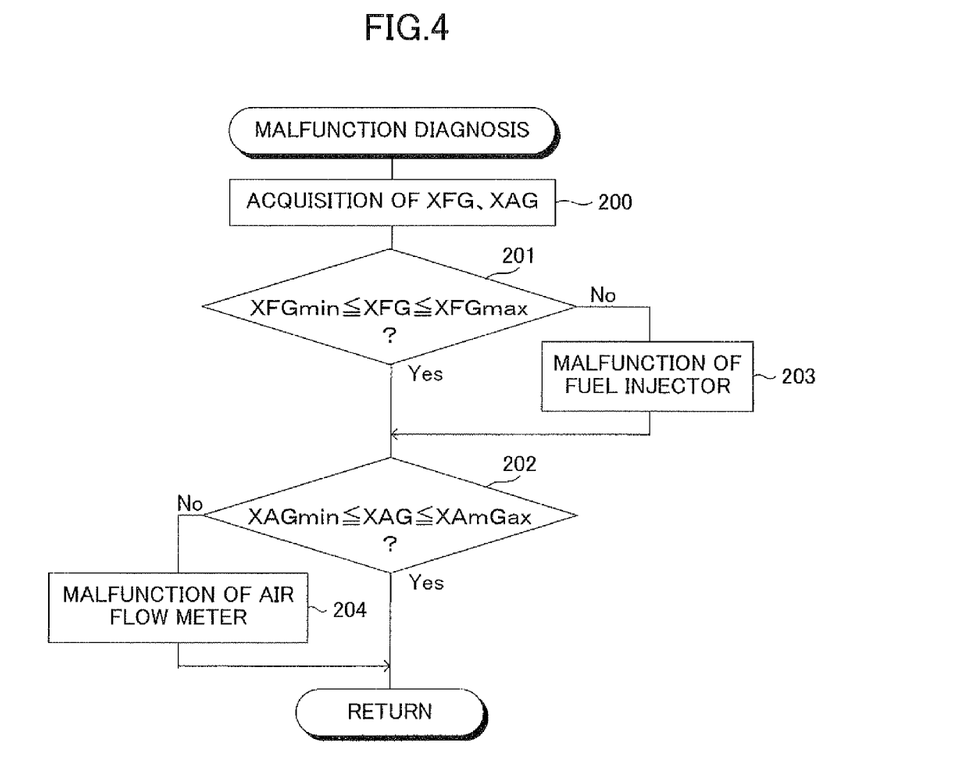
FIG. 4 is a view showing an example of a routine for performing a malfunction diagnosis of fuel injectors and an air flow meter according to the invention.

Next, an example of the routine for performing the malfunction diagnosis of the fuel injector and the air flow meter of the invention will be explained. The example of the routine is shown in FIG. 4. It should be noted that the routine is performed every a predetermined time has elapsed.

When the routine of FIG. 4 starts, at the step 200, the latest learning values XFG and XAG of the fuel injection amount and intake air amount amendment values are acquired. Next, at the step 201, it is judged if the learning value XFG of the fuel injection amount amendment value acquired at the step 200 is within the range defined by the lower limit XFGmin and the upper limit XFGmax (XFGmin≤XFG≤XFGmax). When it is judged that XFGmin≤XFG≤XFGmax, the routine proceeds to the step 202. On the other hand, when it is not judged that XFGmin≤XFG≤XFGmax, the routine proceeds to the step 203 where the occurrence of the malfunction of the fuel injector is indicated and then the routine proceeds to the step 202. When the routine proceeds to the step 202, it is judged if the learning value XAG of the intake air amount amendment value acquired at the step 200 is within the range defined by the lower limit XAGmin and the upper limit XAGmax (XAGmin≤XAG≤XAGmax). When it is judged that XAGmin≤XAG≤XAGmax, the routine is terminated. On the other hand, it is not judged that XAGmin≤XAG≤XAGmax, the routine proceeds to the step 204 where the occurrence of the malfunction of the air flow meter is indicated and then the routine is terminated.

In the above-explained embodiment, upper and lower limits regarding the fuel injection amount amendment value may be provided and the fuel injection amount amendment value may be limited to the upper and lower limits and upper and lower limits regarding the intake air amount amendment value may be provided and the intake air amount amendment value may be limited to the upper and lower limits. Thereby, the reflecting of the air-fuel ratio due to the difference of the components other than the fuel injection amount difference of the fuel injector and the intake air amount detection difference of the air flow meter to the fuel injection amount and intake air amount amendment values, is avoided and therefore the leaning values becomes stable. Further, in the case that the upper and lower limits regarding the fuel injection amount amendment value are provided, upper and lower limits calculated on the basis of the difference occurring due to one or both of the degradation and the device error of the fuel injector can be employed as the upper and lower limits. Further, in the case that the upper and lower limits regarding the intake air amount amendment value are provided, upper and lower limits calculated on the basis of the difference occurring due to one or both of the degradation and the device error of the air flow meter can be employed as the upper and lower limits.

Further, in the case that it is obvious that the amendment of the fuel injection command value by the fuel injection amount amendment value and the amendment of the detected intake air amount by the intake air amount amendment value do not affect the exhaust gas emission such as NOx or affect it slightly or in the case that it is obvious that the fuel injection amount difference of the fuel injector is not derived from the steady difference of the property of the fuel injector from the base property and is a difference between the fuel injectors during the engine cycle(s) or in the case that the difference of the estimated air-fuel ratio relative to the detected air-fuel ratio is derived from the air-fuel ratio detection difference of the air-fuel ratio sensor or the NOx concentration detection difference of the NOx sensor or the NOx concentration estimation difference of the NOx concentration estimation model, the learning of the fuel injection amount and intake air amount amendment values may be inhibited. Thereby, the excess amendment of the fuel injection command value by the fuel injection amount amendment value can be restricted while the excess amendment of the detected intake air amount by the intake air amount amendment value can be restricted and therefore the control using the fuel injection command value and the detected intake air amount to be amended by the fuel injection amount and intake air amount amendment values becomes stable and thus the exhaust gas emission property becomes stable.

Further, in the above-explained embodiment, an engine operation condition suitable for the calculation of the fuel injection amount and intake air amount amendment values may be previously set and when the engine operation condition corresponds to the previously set engine operation condition, the calculation of the fuel injection amount and intake air amount amendment values may be performed and on the other hand, when the engine operation condition does not correspond to the previously set engine operation condition, the calculation of the fuel injection amount and intake air amount amendment values may not be performed. Thereby, the calculation of the inappropriate fuel injection amount and intake air amount amendment values can be avoided and therefore the exhaust gas emission property becomes stable.

It should be noted that the engine operation condition suitable for the calculation of the fuel injection amount and intake air amount amendment values is, for example, an engine operation condition satisfying one or more conditions where the temperature of the air-fuel ratio sensor reaches the activation temperature thereof, the condition surrounding the air-fuel ratio sensor (e.g. the pressure or the oxygen concentration of the exhaust gas surrounding the air-fuel ratio sensor) is within the range where the air-fuel ratio can be detected by the air-fuel ratio sensor, the condition surrounding the NOx sensor (e.g. the pressure or the oxygen concentration of the exhaust gas surrounding the NOx sensor) is within the range where the NOx concentration can be detected by the NOx sensor, the engine speed or the intake pressure or the intake air amount is within the range allowed in consideration of the possibility or the accuracy of the detection of the air-fuel ratio by the air-fuel ratio sensor, the engine speed or the intake pressure or the intake air amount is within the range allowed in consideration of the possibility or the accuracy of the detection of the NOx concentration by the NOx sensor, and the engine operation condition satisfies the equations 1 and 2.

Further, the above-explained embodiment is one where the fuel injection amount and intake air amount amendment values are calculated, using the NOx concentration of the exhaust gas. However, the invention can be applied to the case where the fuel injection amount and intake air amount amendment values are calculated, using the amount of the NOx of the exhaust gas.

Further, the above-explained embodiment is one where the fuel injection amount and intake air amount amendment values are calculated, using the NOx concentration of the exhaust gas. However, the invention can be applied to the case that the fuel injection amount and intake air amount amendment values are calculated, using the concentration of the unburned hydrocarbon (HC) or the carbon monoxide (CO) of the exhaust gas in place of the NOx concentration of the exhaust gas. That is, the invention can be broadly applied to the case that the fuel injection amount and intake air amount amendment values are calculated, using the concentration of the specified component of the exhaust gas. Further, the invention can be broadly applied to the case that the fuel injection amount and intake air amount amendment values are calculated, using the amount of the specified component of the exhaust gas. It should be noted that the specified component is one which changes, corresponding to the fuel injection amount and the intake air amount.

It should be noted that the fuel injector injects the fuel into the combustion chamber when the fuel injector receives the command for injecting the fuel from the electronic control unit. Therefore, the fuel injector corresponds to means for supplying the fuel to the combustion chamber. Further, the air flow meter outputs to the electronic control unit the output value corresponding to the amount of the air supplied to the combustion chamber. Then, the electronic control unit calculates the amount of the air supplied to the combustion chamber on the basis of the output value. Therefore, the air flow meter corresponds to supplied air amount detection means. Further, the air-fuel ratio sensor outputs to the electronic control unit the output value corresponding to the oxygen concentration of the exhaust gas reaching the sensor. Then, the electronic control unit calculates the air-fuel ratio of the mixture gas formed in the combustion chamber on the basis of the output value. Therefore, the air-fuel ratio sensor corresponds to air-fuel ratio detection means. NOx sensor outputs to the electronic control unit the output value corresponding to the NOx concentration of the exhaust gas reaching the sensor. Then, the electronic control unit calculates the NOx concentration of the exhaust gas on the basis of the output value. Therefore, the NOx sensor corresponds to NOx concentration detection means. Further, since the NOx is the specified component of the exhaust gas, the NOx sensor corresponds to means for detecting the concentration of the specified component of the exhaust gas.

Further, the electronic control unit sets the amount of the fuel to be injected into the combustion chamber by the fuel injector as the target fuel injection amount. Therefore, the electronic control unit has a function as target fuel injection amount setting means. Further, the electronic control unit calculates the fuel injection command value for making the fuel injector inject the fuel of the target fuel injection amount into the combustion chamber on the basis of the target fuel injection amount and provides the fuel injection command value to the fuel injector. Therefore, the electronic control unit has a function as fuel injection command value providing means. Further, the electronic control unit calculates the air-fuel ratio of the mixture gas formed in the combustion chamber on the basis of the fuel injection amount and the intake air amount. Therefore, the electronic control unit has a function as air-fuel ratio calculation means. Further, the electronic control unit calculates the NOx concentration of the exhaust gas discharged from the combustion chamber on the basis of the fuel injection amount and the intake air amount. Therefore, the electronic control unit has a function as NOx concentration calculation means. Further, since the NOx is the specified component of the exhaust gas, the electronic control unit has a function as means for calculating the concentration of the specified component of the exhaust gas discharged from the combustion chamber on the basis of the fuel injection amount and the intake air amount.

Further, the above-explained embodiment is one obtained by applying the invention to the compression ignition type engine. However, the invention can be applied to a spark ignition type engine.

The invention claimed is:

1. A control device of an engine, the control device comprising:
   a fuel injector that supplies fuel to a combustion chamber of the engine;
   an air flow meter configured to output a signal corresponding to an amount of air supplied to the combustion chamber;
   an air-fuel ratio sensor configured to output a signal corresponding to an air-fuel ratio of a mixture gas formed in the combustion chamber; and
   a concentration sensor configured to output a signal corresponding to a concentration of a specified component of exhaust gas discharged from the combustion chamber; and
   an electronic control unit having control logic configured to cause the electronic control device to perform the following:
     provide a fuel supply command value to the fuel injector to make the fuel injector supply a target amount of the fuel to the combustion chamber;
     acquire the amount of the fuel supplied to the combustion chamber based on the fuel supply command value as a fuel supply amount;
     acquire the amount of the air supplied to the combustion chamber based on the output signal of the air flow meter as a detected air supply amount;
     acquire the air-fuel ratio based on the output signal of the air-fuel ratio sensor as a detected air-fuel ratio;
     calculate the air-fuel ratio based on the fuel supply amount and the detected air supply amount as a calculated air-fuel ratio;
     acquire the concentration of the specified component based on the output signal of the concentration sensor as a detected concentration;
     calculate the concentration of the specified component based on the fuel supply amount and the detected air supply amount as a calculated concentration; and
     amend the fuel supply command value or the fuel supply amount and the detected air supply amount such that the difference between the detected air-fuel ratio and the calculated air-fuel ratio and the difference between the detected concentration and the calculated concentration becomes substantially zero.

2. The control device of the engine as set forth in claim 1, wherein the specified component is a nitrogen oxide included in the exhaust gas.

3. The control device of the engine as set forth in claim 1, wherein the electronic control unit is further configured to:
   constitute an equation existing between the detected air-fuel ratio and the calculated air-fuel ratio, and constitute an equation existing between the detected concentration and the calculated concentration, by using a fuel supply amount amendment value, the fuel supply amount amendment value compensating for an error of the fuel supplied by the fuel injector, and by using an air supply amount amendment value, the air supply amount amendment value compensating for an error of the detected air supply amount;
   calculate the fuel supply amount amendment value and the air supply amount amendment value by solving a simultaneous equation consisting of the equations; and
   amend the fuel supply command value or the fuel supply amount by the fuel supply amount amendment value, and amend the detected air supply amount by the air supply amount amendment value to decrease the difference between the detected air-fuel ratio and the calculated air-fuel ratio, and the difference between the detected concentration and the calculated concentration.

4. The control device of the engine as set forth in claim 1, wherein the electronic control unit determines that a malfunction is occurring in the fuel injector when an amendment amount for the fuel supply command value is not within a possible range of the amendment amount for the fuel supply command value when no malfunction occurs in the fuel injector.

5. The control device of the engine as set forth in claim 2, wherein the electronic control unit determines that a malfunction is occurring in the air flow meter when an amendment amount for the detected air supply amount is not within a possible range of the amendment amount for the detected air supply amount when no malfunction occurs in the air flow meter.

6. The control device of the engine as set forth in claim 2, wherein the electronic control unit is further configured to:
constitute an equation existing between the detected air-fuel ratio and the calculated air-fuel ratio, and constitute an equation existing between the detected concentration and the calculated concentration by using a fuel supply amount amendment value, the fuel supply amount amendment value compensating for an error of the fuel supplied by the fuel injector, and by using an air supply amount amendment value, the air supply amount amendment value compensating for an error of the detected air supply amount;
calculate the fuel supply amount amendment value and the air supply amount amendment value by solving a simultaneous equation consisting of the equations; and
amend the fuel supply command value or the fuel supply amount by the fuel supply amount amendment value, and amend the detected air supply amount by the air supply amount amendment value to decrease the difference between the detected air-fuel ratio and the calculated air-fuel ratio, and the difference between the detected concentration and the calculated concentration.

7. The control device of the engine as set forth in claim 2, wherein the electronic control unit determines that a malfunction is occurring in the fuel injector when an amendment amount for the fuel supply command value is not within a possible range of the amendment amount for the fuel supply command value when no malfunction occurs in the fuel injector.

8. The control device of the engine as set forth in claim 3, wherein the electronic control unit determines that a malfunction is occurring in the fuel injector when an amendment amount for the fuel supply command value is not within a possible range of the amendment amount for the fuel supply command value when no malfunction occurs in the fuel injector.

9. The control device of the engine as set forth in claim 2, wherein the electronic control unit determines that a malfunction is occurring in the air flow meter when an amendment amount for the detected air supply amount is not within a possible range of the amendment amount for the detected air supply amount when no malfunction occurs in the air flow meter.

10. The control device of the engine as set forth in claim 3, wherein the electronic control unit determines that a malfunction is occurring in the air flow meter when an amendment amount for the detected air supply amount is not within a possible range of the amendment amount for the detected air supply amount when no malfunction occurs in the air flow meter.

11. The control device of the engine as set forth in claim 4, wherein the electronic control unit determines that a malfunction is occurring in the air flow meter when an amendment amount for the detected air supply amount is not within a possible range of the amendment amount for the detected air supply amount when no malfunction occurs in the air flow meter.

* * * * *